July 4, 1967 W. F. SKEATS Re. 26,233

ELECTRIC BUS DUCT APPARATUS

Original Filed March 30, 1959 2 Sheets-Sheet 1

Inventor:
Wilfred F. Skeats,
by William Freedman
His Attorney.

ELECTRIC BUS DUCT APPARATUS

Original Filed March 30, 1959 2 Sheets-Sheet 2

Inventor:
Wilfred F. Skeats,
by William Freedman
His Attorney

United States Patent Office

Re. 26,233
Reissued July 4, 1967

26,233

ELECTRIC BUS DUCT APPARATUS

Wilfred F. Skeats, Lansdowne, Pa., assignor to General Electric Company, a corporation of New York Original No. 3,015,743, dated Jan. 2, 1962, Ser. No. 802,822, Mar. 30, 1959. Application for reissue Aug. 17, 1966, Ser. No. 576,174
20 Claims. (Cl. 307—147)

Matter enclosed in heavy brackets [ ] appears in the original patent but forms no part of this reissue specification; matter printed in italics indicates the additions made by reissue.

*ABSTRACT OF THE DISCLOSURE*

*Isolated-phase bus duct apparatus comprising spaced-apart, side-by-side ducts of highly conductive material respectively surrounding the usual phase conductors. The ducts are electrically interconnected at their ends by means forming short circuit connections between the ducts during the flow of both normal and short circuit currents through the phase conductors. Each duct is electrically continuous between the short circuit connections and comprises a series of duct lengths disposed in end-to-end relationship and electrically interconnected by means comprising welded joints extending about substantially the entire periphery of the duct lengths.*

This invention relates to electric bus duct apparatus and, more particularly, to bus duct apparatus of the isolated phase type in which each of the usual conductors of the apparatus is individually enclosed by a grounded duct or sheath made of a highly conductive material.

In the usual design of isolated-phase bus duct apparatus, the conductor is supported within its enclosing duct by means of insulators provided at spaced-apart stations along the length of the conductor. The insulators serve not only to support the weight of the conductor but serve also to support the conductor against the high electromagnetic forces which are usually developed during short-circuit conditions. Since these electro-magnetic forces can impose severe loads on the insulators, much effort has been expended in the past in seeking ways of reducing the electromagnetic forces or of otherwise reducing the insulator loads. As an example, application S.N. 458,900, Swerdlow et al., now Patent No. 2,892,012, assigned to the assignee of the present invention, shows one approach by which substantial reductions in these insulator loads can be obtained.

An object of the present invention is to obtain still further reductions in the loads to which the conductor-supporting insulators will be subjected during short circuit conditions.

A further object is to reduce to very low values the electromagnetic forces which act upon the ducts themselves during short-circuit conditions.

In prior constructions, it has been the practice to provide the ducts with insulation located between the ducts and their supporting structure and between longitudinally-adjacent lengths of each duct. One of the main purposes of such insulation has been to preclude eddy currents induced in the ducts from finding circulating paths through adjacent supporting structure, thereby precluding these eddy currents from undesirably heating the supporting structure. This insulation has been relatively costly, and its presence has necessitated numerous design complications.

Thus, another object of my invention is to construct the bus duct apparatus in such a manner as to obviate the need for the usual insulation between the ducts and their supporting structure and between the longitudinally-adjacent lengths of each duct.

Conductive parts that are disposed near a bus-duct apparatus can be excessively heated by eddy currents induced in such parts. Accordingly, a further object of my invention is to materially reduce this heating effect in comparison to that encountered with prior bus-duct apparatus of corresponding current rating.

In attaining these objects, I rely upon enclosing ducts which are electrically continuous throughout most of their length, which in many cases, might be as much as 50 or 100, or even more, feet. In prior constructions utilizing ducts of such lengths, there has been the problem of possibly-hazardous voltages being developed between points on the duct and ground and between spaced-apart points on the same duct or adjacent ducts.

Accordingly, another object of my invention is to construct the bus-duct apparatus in such a manner that, even though the ducts are of great length, the aforementioned voltages are held to very low values which present no significant shock hazard to personnel who might come into contact with the ducts.

In carrying out my invention in one form, I provide at least two conductors, each of which is disposed within an enclosing duct of highly conductive material. Suitable insulators are provided for mounting each of the conductors in substantially coaxial relationship relative to its enclosing duct. The two ducts are electrically connected together at their opposite ends by connecting means providing a short-circuit connection between the two ducts at their opposite ends. The ducts are electrically continuous between these short-circuit connections so as to enable currents induced in each duct to circulate around a loop defined by the series combination of said ducts and said short-circuit connections. The connecting means form short-circuit connections between the ends of the two ducts both during the flow of normal current through the conductors and during the flow of short-circuit current through the conductors. *Each of the ducts comprises a series of duct lengths disposed in end-to-end relationship and welded joints extending about substantially the entire periphery of said duct lengths for carrying the induced currents between said duct lengths.*

For a better understanding of my invention, reference may be had to the following description taken in connection with the accompanying drawing wherein.

Figure 1:
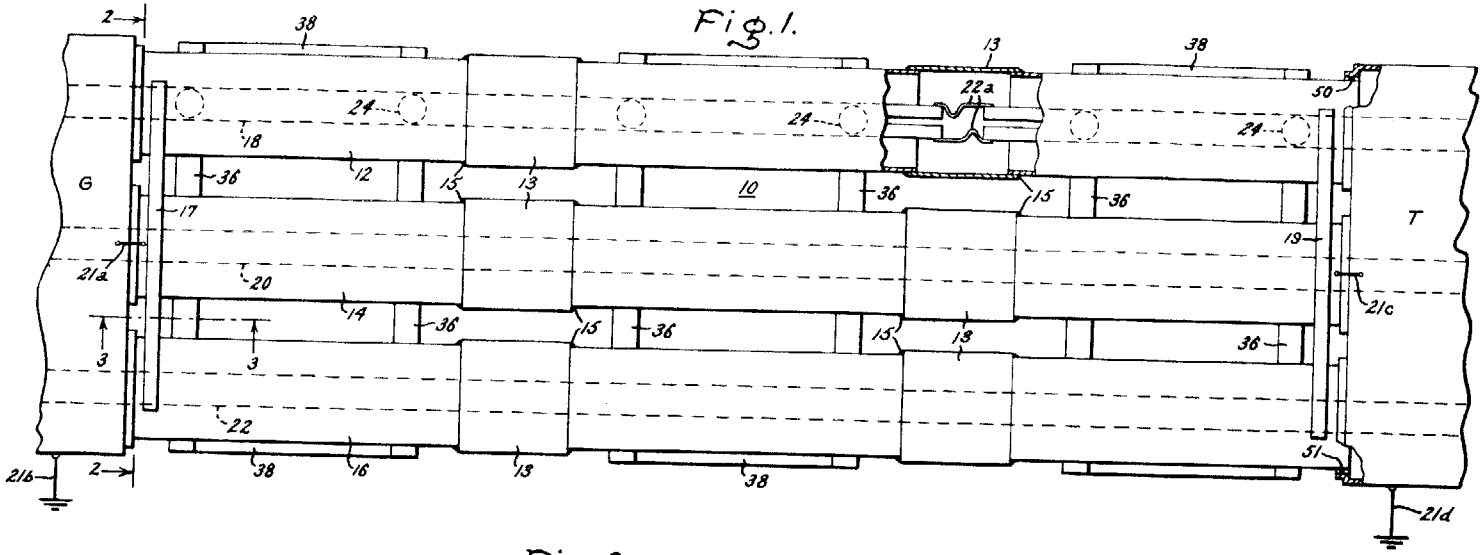
FIG. 1 is a plan view, partially schematic and partially in section, showing three phase bus duct apparatus embodying my invention.

Referring now to FIG. 1, three-phase bus duct apparatus embodying my invention is depicted at 10 electrically interconnecting a station power generator G and a power transformer T, both of which are schematically illustrated in block form. The bus duct apparatus 10 comprises three spaced-apart tubular ducts 12, 14, and 16 of a highly conductive material, such as aluminum, extending from a region immediately adjacent the generator G to a region immediately adjacent the transformer T. Preferably, each of these ducts 12, 14, and 16 is made up of a plurality of duct lengths, each of which extends over only a relatively small portion of the overall length of the duct. These duct lengths are conductively joined together in end-to-end relationship, preferably by means of tubular sleeves 13, each of which encircles the juxtaposed ends of a pair of adjacent duct lengths and is joined to the adjacent duct lengths by means of welded joints 15 which extend circumferentially about the entire periphery of the duct. As a result, each duct is electrically continuous throughout its entire length.

Figure 2:
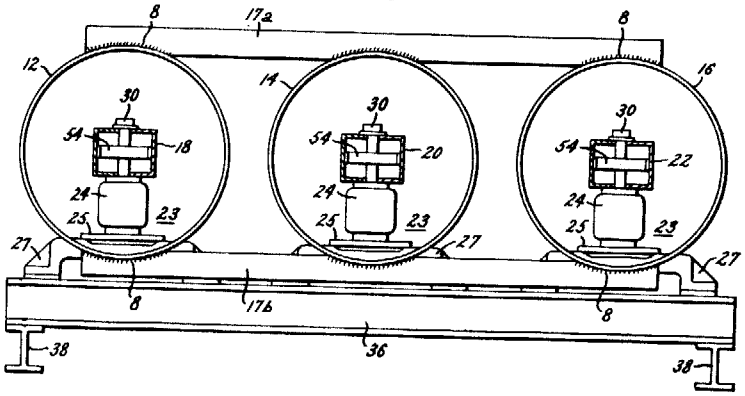
FIG. 2 is a sectional view of the apparatus of FIG. 1 taken along the line 2—2 of FIG. 1.

As shown in FIGS. 1 and 2, the ducts 12, 14, and 16 are electrically interconnected at opposite ends of the bus run by means of conductive structures 17 and 19. Each of these conductive structures 17 and 19 preferably comprises a pair of channels, one of which is connected to the top portion of the ducts and the other of which is connected to the bottom portion of the ducts. This can best be seen in FIGS. 2 and 3, where the conductive structure 17 is shown as comprising a pair of channels 17a and 17b both extending between the ducts and respectively connected to the top and bottom portions of the ducts. The connection between each duct and each channel preferably comprises a welded joint 8 extending over a substantial portion of the duct periphery. The channels, which are preferably made of a highly conductive material such as aluminum, for example, each form a short circuit connection between the ducts for induced currents flowing therein. The purpose of these short circuit connections will be explained in greater detail hereinafter.

The three ducts which are all electrically interconnected by means of the conductive structure 17, 19, are solidly connected to ground, preferably, at both the transformer end and the generator end of the bus duct apparatus 10. The connection to ground at the generator end of the bus duct apparatus is preferably provided by means of a conductive bar 21a electrically connected between one of the ducts 14 and the metallic housing of the generator and by a ground connection 21b provided between the generator housing and ground. The connection to ground at the transformer end of the bus duct apparatus is preferably provided by means of a conductive bar 21c electrically connected between duct 14 and the metallic housing of the transformer and by a ground connection 21d between the transformer housing and ground. The other two ducts 12 and 16 each have their opposite ends insulated from the generator housing and from the transformer housing. Such insulation, as it exists at the transformer housing, is shown at 50 and 51. The purpose of such insulation at the transformer housing is to prevent currents induced in the ducts from circulating from one duct to another via a path which includes the transformer housing and bar 21c. Similarly the purpose of such insulation at the generator is to prevent currents induced in the ducts from circulating from one duct to another via a path which includes the generator housing and bar 21a. If the induced currents were allowed to follow either of these paths, i.e., through the transformer or generator housings, such currents could produce localized overheating of these housings.

Disposed within each duct is a phase-conductor electrically interconnecting the appropriate windings of the generator and the transformer. These phase conductors are respectively designated 18, 20, and 22. Each of these conductors 18, 20, and 22 is preferably formed from a series of rigid conductive sections longitudinally connected together in end-to-end relationship by suitable flexible conductive joints which are longitudinally aligned with the duct sleeves 13. One of these flexible joints is shown, for example, at 22a in FIG. 1. Each of the conductive sections is preferably formed from two channels disposed with their flanges in face-to-face relationship and secured together by means of suitable straps 54 fixed to each channel, as shown in FIG. 2.

Figure 3:
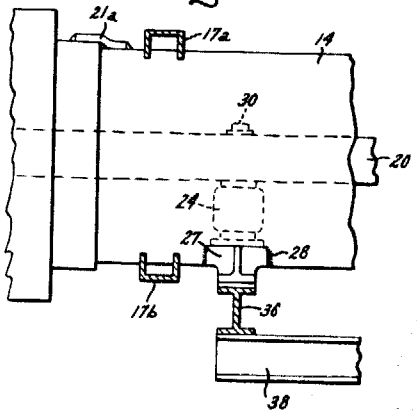
FIG. 3 is a sectional view taken along the line 3—3 of FIG. 1.

Each phase-conductor is mounted within its enclosing duct in generally coaxial relationship with respect to the duct. For mounting each phase-conductor in this manner, suitable insulating structure (for example, of the type shown in application S.N. 770,970, Mankoff et al., now Patent No. 2,972,005, assigned to the assignee of the present invention) is provided at longitudinally spaced-apart locations within each duct. Referring to FIGS. 2 and 3, this insulating structure 23 is shown as comprising a single porcelain insulator 24 at each insulator station within a duct. Each insulator 24 is attached to a resilient base plate 25 that, in turn, is secured to a support 27 extending in a chordal direction across the lower portion of its duct. These supports 27, which are also of aluminum, are each fitted in a slot provided in the lower wall of the duct and are each welded to the duct about the perimeter of the slot, as shown at 28 in FIG. 3. As shown in FIGS. 2 and 3, the bus conductors 18, 20, and 22 are mounted atop the insulators by suitable bolts 30 extending through the space provided between the two channels forming each length of conductor. At certain of the insulator stations, these bolts 30 are used to fix the conductor to its insulator 24, and at certain others the bolts 30 are suitably arranged to permit longitudinal movement of the conductor relative to its insulator so as to allow for thermal contraction and expansion of the conductor. Since the details of these insulator mounting arrangements 23 form no part of the present invention, further description thereof in the present application is believed to be unnecessary. For a more detailed description of the illustrated insulating structure, reference may be had to the aforementioned Mankoff et al. application.

The supports 27 serve not only to support the conductors 18, 20, and 22 but serve also to support the enclosing ducts [14, 16, and 18] *12, 14, and 16* with which they are associated. In this regard, the welded joints 28 provided between each duct and its support 27 are relied upon for attaching the ducts to the supports 27. The supports 27 for the three ducts are preferably disposed in aligned position along the length of the ducts so that a single transverse beam 36 provided at each insulator station can be used as a common support for the three ducts. The supports 27 are preferably bolted directly to these beams 36 without the interposition of any insulation between the supports 27 and the beams 36.

The usual building steel which supports the bus duct apparatus ordinarily comprises beams such as 38 upon which adjacent pairs of transverse beams 36 are mounted. These beams 38 are shown disposed at opposite ends of the transverse beams 36 and extending in a direction generally parallel to the bus run. The transverse beams 36 are preferably bolted directly to these longitudinal extending beams without the interposition of any insulation between two sets of beams.

When the bus duct apparatus is in operation, the current that flows in each of the bus-conductors 18, 20, and 22 will induce in the duct surrounding that particular bus-conductor a current substantially equal and opposite to the current flowing in the bus-conductor. In view of the fact that each duct is electrically continuous and in view of the short-circuiting connections 17 and 19 provided at opposite ends of the ducts, the current induced in each duct will flow along substantially the entire length of the duct in question and will find a return path through the two adjacent ducts and the short-circuiting connections 17 and 19. This is in marked contrast to the conventional construction, where great pains are normally taken to prevent current induced in the ducts from flowing through external circuits.

It will be noted that the end connections 17 and 19 form short-circuit connections between the ducts irrespective of the value of the induced current that is flowing through the ducts. Thus, there is a short-circuit connection provided between the ends of the ducts both during the flow of normal current through the phase conductors 18, 20, and 22 and during the flow of short-circuit currents through any of the phase conductors. It will be further noted that if the three ducts be considered collectively and under normal three-phase conditions, the induced currents in the three ducts will add up vectorially to zero, so that no additional return path is required for currents induced in the ducts. Under such normal conditions, substantially all the current induced in each duct returns via the other two ducts.

A number of very important advantages are obtained by allowing the above-described current induced in the ducts to flow. These advantages will become apparent when it is realized that the current flowing in any one of the ducts will generate flux which is in a direction to oppose or buck down the flux generated by current flowing through the bus-conductor within that duct. By reason of this flux-opposing relationship, nearly all of the flux that would otherwise have escaped from the duct is confined within the duct. This very materially reduces the amount of flux that is available to enter the adjacent ducts. Since the electromagnetic forces on the conductors are directly dependent upon the amount of flux that does enter the adjacent ducts, it will be apparent that the electromagnetic forces between the conductors are drastically reduced as a result of this confinement of flux inside of the duct where the flux is being generated.

There is, in effect, a two-stage reduction in the amount of flux that enters the adjacent duct. The first stage reduction occurs by reason of the fact that very little flux is allowed to escape from the duct where the flux is being generated, as described hereinabove, and [the] the second stage occurs by reason of the fact that nearly all of that flux which does escape is prevented from entering the adjacent duct. With regard to this second stage, the flux generated by eddy currents flowing in the adjacent duct opposes the escaping flux and substantially prevents its entry into the adjacent duct. Thus, there is little flux available to create magnetic forces between the adjacent bus-conductors.

A related factor controlling the amount of force that is present on any of the conductors is the distribution of the induced current in the surrounding duct. If the induced current is distributed equally at diametrically-opposed points on the duct, there will be no net force resulting from the induced current tending to displace the conductor from its position at the center of the duct. In the disclosed duct apparatus, each of the ducts is continuous in a circumferential direction at substantially all points along its length and is also coaxial with respect to its conductor. As a result, the induced current is distributed substantially equally at diametrically-opposed points on the duct, and substantially no net force results from the induced current tending to displace the conductor from its position at the center of the duct. This relationship exists for substantially all values of current flowing through the conductors, and, thus, under even the most severe short circuit conditions, substantially no force results from the induced current tending to displace each of the conductors from the center of its duct. The important advantages resulting from the low force relationships present, in terms of reduced insulator costs and of reduced possibilities of insulator fracture, are readily apparent.

The electromagnetic forces exerted on the sheet metal ducts vary in magnitude as a direct function of the amount of flux that is permitted to escape from the ducts. Since the amount of flux that is permitted to escape is held to a very low value, as explained hereinabove, it will be apparent that the forces exerted on the ducts are likewise held to a very low value.

The fact that the amount of flux escaping from each of the ducts is held to very low value also enables me to dispense with the insulation that is customarily provided between the ducts and the transverse beams and between adjacent lengths of each duct. In this regard, the purpose of this insulation in prior construction has been to preclude currents induced in the ducts from finding circulating paths through the supporting structure, thus precluding these eddy currents from undesirably heating the supporting structure. Because these prior constructions have allowed large amounts of flux to escape from the ducts, large amounts of flux have linked the loop made up of the supporting structure, with the result being that very high currents would have flowed in the loop had it been part of a completed circuit. Because the disclosed apparatus is constructed to prevent nearly all of the flux from escaping from the ducts, the amount of flux linking the loop made up of the supporting structure and a length of duct is small, and, therefore, the current tending to flow through the loop is small. Thus, even though the loop is a completed one, the current flowing through the loop is quite small and is insufficient to produce objectionable heating. The same considerations apply, of course, whether the loop is made up of supporting structure and a length of one duct or whether it is made up of lengths of adjacent ducts interconnected by supporting structure. In either case, the amount of flux linking the loop is small, and hence, the current tending to flow through the loop is small.

Along these same general lines, the construction of the present invention materially reduces the heating of other nearby metal. In this regard, since there is no substantial magnetic field external to the ducts, other nearby metal will not be linked by a substantial amount of flux, and thus the eddy currents induced therein will be very low and of insufficient value to produce objectionable heating. It is for this general reason that I am able to dispense with the insulation that is customarily provided between the transverse beams 36 and the building steel 38.

Heretofore, it has generally been thought that using electrically continuous duct sections of great length necessarily involves developing objectionably high voltages between certain points on the duct section and ground. In this regard, when the current induced in a duct has no external path over which to flow (as has usually been the case with prior constructions), a progressively increasing voltage has been developed between the duct and ground at points on the duct which are at progressively greater distances from the point at which the duct is grounded. For example, in a typical prior bus duct apparatus rated at 6500 amperes, approximately 10 volts per 40 feet of duct length has been developed. Such voltages present possible shock hazards to maintenance and operating personnel who might come into contact with the ducts, and for this reason, it has been customary to avoid electrically-continuous duct sections of relatively great length.

In contrast to the relatively high voltages heretofore developed between the duct and ground, the apparatus of the present invention develops only negligible voltages (e.g. on the order of a few percent of the voltages developed with prior designs of equal electrically-continuous duct length). Responsible for this very low voltage is the fact that each duct is short-circuited at its opposite ends by an external circuit comprising the series combination of an adjacent duct and the short-circuiting end connections 17, 19. The effective impedance of this external circuit is only that of a portion of the end connections since the other two phases generate a voltage sufficient to cancel out the impedance of the return path over their ducts. With this very low impedance external circuit present, the amount of flux escaping from the duct in question is only enough to generate sufficient voltage in the duct to provide the IR drop for a flow of current in the ducts substantially equal and opposite to the current in the conductor inside the duct. Therefore, the voltage measureable along the length of any duct between the short-circuiting bars 17 and 19 (assuming that the measurement is made at the surface of the duct) equals the voltage required to provide the IR drop for a current equal to line current flowing through the circuit in question. Since in the illustrated embodiment each of the ducts is of a generally uniform construction extending continuously between the short circuit connections 17 and 19, it will be apparent that the voltage for driving induced current through a given duct is generated generally uniformly along the length of the duct between the short circuit connections 17 and 19.

More important voltages, however, from the standpoint of shock considerations, are the voltages measurable from a duct to ground or between the ducts of different phases. These voltages will in general be very much less than the above described voltage measurable along the surface of the duct. One reason that such voltages will be less is that the effective value of a voltage in the presence of a magnetic field may be quite substantially affected by the path of the loop around which the voltage is applied. In this case, the flux which will be linked by a loop extending from the duct is of a polarity such as to balance out the resistance drop in the duct so far as the total voltage generated in the loop is concerned. The extent to which this balancing-out takes place is such that if the loop consists of a length of the outside surface of one of the ducts plus two parallel radial sections projecting therefrom and a conductor joining the outside ends of the two radial sections at a distance from the nearest duct of twice the duct diameter, the voltage induced in the loop will balance out about half of the IR drop.

Another reason that the voltage measurable between points on the duct and ground is low is that if the duct is securely grounded at both ends, as shown, and a voltage is measured over a radial path to ground at an intermediate point on the duct, potential drop along the ground return path (when current flows in such ground return path) will tend to parallel the potential drop along the duct so that the [diffeerntial] *differential* voltage is only that arising from end effects and from deviations from uniformity in resistance per unit length or flux linkages per unit length. Likewise, the voltage between adjacent points on the ducts of different phases will be only that arising from such deviations, and since such deviations are likely to be very small as regards effects generating voltage between phases, this voltage will be extremely low.

As an illustration of the extent to which voltages may be reduced in this manner, it may be pointed out that with a typical bus duct 27 inches in diameter with a wall thickness of ¼ inch and built of metal with a resistivity of 1.7 microhm-inches, the IR drop even with a short circuit current of 100,000 amperes is only 10 volts per hundred feet, and this is further reduced by the two considerations set forth immediately above so that the actual voltage available across any usual short circuit path will not exceed about one or two volts at 100,000 amperes.

In the preferred form of my invention described hereinabove, the longitudinally-adjacent duct sections of each duct are interconnected by means of welded joints extended circumferentially about the entire periphery of the duct sections. Although this type of joint is preferred, it will be apparent that other types of joints could instead be utilized, such as, for example joints comprising straps or flexible braids interconnecting the tandem duct sections and bolted or welded to the duct sections at circumferentially-spaced locations around the periphery of each duct.

Although I prefer that each duct section be circumferentially continuous at substantially all points along its length, the invention in its broader aspects is not limited to such a construction. In this regard, longitudinal-extending seams can, if desired, be provided in the duct sections, providing these seams do not interfere with the induced currents distributing themselves substantially equally at diametrically opposed points along the length of the duct section.

Grounding the duct apparatus at both of its ends, as shown in FIG. 1, is advantageous for a number of reasons. One reason is that fault currents produced by a fault to ground occurring within the transformer can return to the generator via a return path which extends through the ducts. For example, a fault to the grounded housing of the transformer from one of its windings would return to the generator via a return path extending through the transformer housing, the grounding connection 21c at the transformer, the ducts 12, 14, and 16, the grounding connection 21a at the generator, and the metallic housing of the generator. If the fault is a single phase fault to ground, the return current will flow primarily in the duct of the shorted phase and to a substantially lesser extent in the ducts of the other phases and to a very much lesser extent in other ground return paths. This is the case because the duct of the shorted conductor is closer to the shorted conductor and therefore forms a return path of substantially reduced reactance in comparison to the reactance of the other ducts and, particularly, in comparison to the reactance of other ground return paths, even though such other ground return paths may be substantially shorter. Thus, there will be a substantial reduction of short circuit currents in such other ground return paths. This is advantageous because such other ground return paths might extend through the building steel, and it is most desirable to limit the current flow through the building steel. Also, returning the fault current through the duct of the shorted conductor further helps to hold the conductor in its normal position at the center of the conductor thereby counteracting any displacing forces which would tend to load the insulators supporting the conductor.

Figure 4:
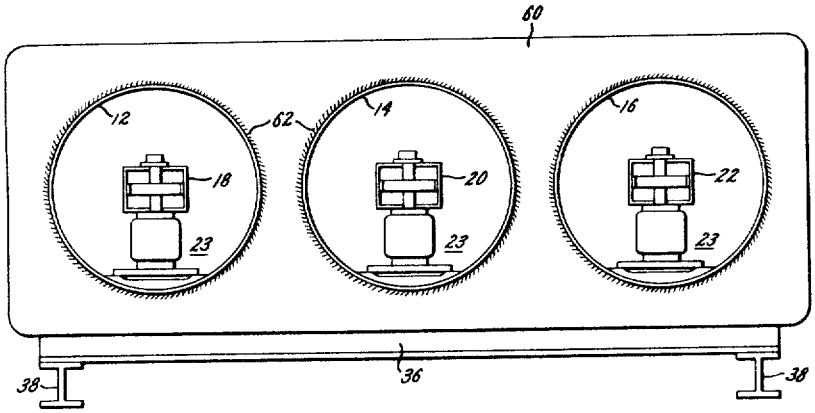
FIG. 4 is a sectional view of a modified form of my invention taken along a line corresponding to the line 2—2 of FIG. 1.

Although I have shown the short-circuiting end connections 17 and 19 in the above-described modification as being formed of channels, it is to be understood that other structural forms may instead be utilized for these connections. For example, referring to FIG. 4, one suitable alternative connection is shown as being formed from a conductive plate 60, preferably of aluminum provided with circular openings into which the ducts 12, 14, and 16 fit. A weld 62 is provided between the plate 60 and each duct about substantially the entire outer peiphery of each of the ducts to provide a good conductive joint between the ducts and the plate 60. An advantage of this particular connecting means is that there is no significant tendency for current concentrations to occur in localized portions of the duct adjacent the connecting means inasmuch as such current can flow into or out of the connecting plate 60 from any point on the periphery of the duct. The short-circuiting connection at either or both ends of the duct can be formed from such a plate 60.

If the bus duct apparatus of my invention is to be used for delivering power to or from single phase delta-connected apparatus, slight modifications will be desirable insofar as the short-circuiting connections are concerned. For example, in FIG. 5, three single-phase transformers 70, 71, and 72 are shown with their respective windings 73, 74, and 75 connected in delta for receiving power supplied over bus duct apparatus 10 generally corresponding to the bus duct apparatus of FIG. 1. The branches of the conductors 18, 20, and 22 leading to the windings are surrounded by appropriate branches of the ducts 12, 14, and 16. At the transformer 70, the branches 14a and 16a of the ducts 14 and 16, respectively, are electrically interconnected by a short-circuiting connection 80. At the transformer 71, the branches 16b and 12a of ducts 16 and 12 respectively, are electrically interconnected by a short-circuiting connection 81. At the transformer 72, the branches 12b and 14b of the ducts 12 and 14 respectively are electrically interconnected by a short-circuiting connection 82. These short-circuiting connections 80, 81, and 82 serve substantially the same purposes as the short-circuiting connection 19 of FIG. 1.

For grounding the transformer end of the ducts, one of the duct branches at each transformer is connected to the grounded transformer housing by suitable electrical connecting means extending between the end of the duct branch and the transformer housing. These connecting means are respectively designated 83, 84, and 85. The end of the other duct branch for each transformer is insulated from the transformer housing so as to prevent induced currents from circulating between the two branch ducts via the transformer housing, as was explained in greater detail in connection with FIG. 1a. If desired, the grounding connection at each transformer can be made between the short-circuiting connection 80, 81 or 82 and the transformer housing, in which case both duct branches should be insulated from the transformer housing.

Figure 5:
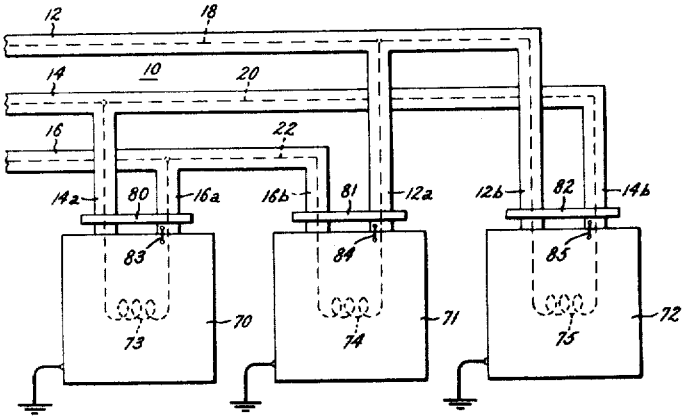
FIG. 5 is a schematic view showing another embodiment of my invention.

Ordinarily whether the generator for supplying power to the bus duct apparatus 10 of FIG. 5 has its windings star-connected or delta-connected, the generator terminals are sufficiently close together that the bus duct apparatus could correspond to that of FIG. 1 at the generator end thereof.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. Isolated-phase bus duct apparatus comprising at least two spaced-apart ducts of highly conductive material each of which has an external perimeter of at least 32 inches, a phase conductor disposed within each duct, insulating means including columns of insulating material at longitudinally-spaced locations along each conductor for mounting said conductors in substantially coaxial relationship with respect to their surrounding ducts, connecting means for providing short-circuit connections between said ducts at opposite ends of said two ducts, each of said ducts being electrically continuous between said short-circuit connections so as to enable induced currents to circulate around a loop defined by the series combination of said ducts and said connecting means, each of said ducts surrounding its conductor at substantially all points along the length of the conductor between said short-circuit connections, said connecting means forming short-circuit connections between the ends of said two ducts both during the flow of normal current through said phase conductors and during the flow of short-circuit current through said phase conductors, the resistance per unit length of each duct being such that the vectorial difference between the current in its corresponding phase conductor and the induced current in said duct is less than one third of the phase conductor current, *each of said ducts comprising a series of duct lengths disposed in end-to-end relationship, and means electrically interconnecting adjacent duct lengths comprising welded joints extending about substantially the entire periphery of said duct lengths for carrying induced current between said duct lengths.*

2. In the bus duct apparatus of claim 1, conductive supports for said ducts extending between said ducts at spaced-apart locations along the length of the ducts, and means for mounting said ducts on said supports and for electrically connecting said supports to said ducts in such a manner that said supports define at least two longitudinally spaced-apart electrical connections between said ducts located longitudinally between said short-circuit connections.

3. [The bus duct apparatus of claim 1 in which] *Isolated-phase bus duct apparatus comprising at least two spaced-apart ducts of highly conductive material each of which has an external perimeter of at least 32 inches, a phase conductor disposed within each duct, insulating means including columns of insulating material at longitudinally-spaced locations along each conductor for mounting said conductors in substantially coaxial relationship with respect to their surrounding ducts, connecting means for providing short-circuit connections between said ducts at opposite ends of said two ducts, each of said ducts being electrically continuous between said short-circuit connections so as to enable induced currents to circulate around a loop defined by the series combination of said ducts and said connecting means, each of said ducts surrounding its conductor at substantially all points along the length of the conductor between said short-circuit connections, said connecting means forming short-circuit connections between the ends of said two ducts both during the flow of normal current through said phase conductors and during the flow of short-circuit current through said phase conductors, the resistance per unit length of each duct being such that the vectorial difference between the current in its corresponding phase conductor and the induced current in said duct is less than one third of the phase conductor current,* each of said ducts [is] *being* electrically continuous in a peripheral direction at substantially all points along the entire portion of its length disposed between said short-circuit connections so as to provide for substantially equal values of induced current at generally diametrically-opposed points on the duct.

4. [The bus duct apparatus of claim 1 in which] *Isolated-phase bus duct apparatus comprising at least two spaced-apart ducts of highly conductive material each of which has an external perimeter of at least 32 inches, a phase conductor disposed within each duct, insulating means including columns of insulating material at longitudinally-spaced locations along each conductor for mounting said conductors in substantially coaxial relationship with respect to their surrounding ducts, connecting means for providing short-circuit connections between said ducts at opposite ends of said two ducts, each of said ducts being electrically continuous between said short-circuit connections so as to enable induced currents to circulate around a loop defined by the series combination of said ducts and said connecting means, each of said ducts surrounding its conductor at substantially all points along the length of the conductor between said short-circuit connections, said connecting means forming short-circuit connections between the ends of said two ducts both during the flow of normal current through said phase conductors and during the flow of short-circuit current through said phase conductors, the resistance per unit length of each duct being such that the vectorial difference between the current in its corresponding phase conductor and the induced current in said duct is less than one third of the phase conductor current,* each of said ducts [comprises] *comprising* a plurality of duct lengths each of which is electrically continuous in a peripheral direction along substantially its entire length, and means for electrically interconnecting said duct lengths in such a manner as to distribute induced currents substantially equally at generally diametrically-spaced points about the periphery of each duct.

5. The apparatus of claim 4 in which said means for electrically interconnecting duct lengths comprises welded joints extending about substantially the entire periphery of said duct lengths.

6. [The apparatus of claim 1 in which] *Isolated-phase bus duct apparatus comprising at least two spaced-apart ducts of highly conductive material each of which has an external perimeter of at least 32 inches, a phase conductor disposed within each duct, insulating means including columns of insulating material at longitudinally-spaced locations along each conductor for mounting said conductors in substantially coaxial relationship with respect to their surrounding ducts, connecting means for providing short-circuit connections between said ducts at opposite ends of said two ducts, each of said ducts being electrically continuous between said short-circuit connections so as to enable induced currents to circulate around a loop defined by the series combination of said ducts and said connecting means, each of said ducts surrounding its conductor at substantially all points along the length of the conductor between said short-circuit connections, said connecting means forming short-circuit connections between the ends of said two ducts both during the flow*

*of normal current through said phase conductors and during the flow of short-circuit current through said phase conductors, the resistance per unit length of each duct being such that the vectorial difference between the current in its corresponding phase conductor and the induced current in said duct is less than one third of the phase conductor current,* each of the ducts [is] *being* constructed in such a manner that the induced current flowing in the duct is distributed substantially equally at substantially all generally diametrically-opposed points along the length of the duct extending between said short-circuit connections.

7. Isolated-phase bus duct apparatus comprising at least two spaced-apart ducts of highly conductive material each of which has an external perimeter of at least 32 inches, a phase conductor disposed within each duct, and extending longitudinally thereof, insulating means including columns of insulating material at longitudinally-spaced locations along each conductor for mounting said conductors within their respective ducts, connecting means for providing short-circuit connections between said ducts at opposite ends of said two ducts, each of said ducts being electrically continuous between said short-circuit connections so as to enable induced currents to circulate around a loop defined by the series combination of said ducts and said connecting means, each of said ducts surrounding its phase conductor at substantially all points along the length of the conductor between said short-circuit connections, said connecting means forming short-circuit connections between the ends of said two ducts both during the flow of normal current through said phase conductors and during the flow of short-circuit current through said phase conductors, the resistance per unit length of each duct being such that the vectorial difference between the current in its corresponding phase conductor and the induced current in said duct is less than one-third of the phase conductor current, *each of said ducts comprising a series of duct lengths disposed in end-to-end relationship, and means for electrically interconnecting adjacent duct lengths comprising welded joints extending about substantially the entire periphery of said duct lengths for carrying induced current between said duct lengths.*

8. [The apparatus of claim 7 in which] *Isolated-phase bus duct apparatus comprising at least two spaced-apart ducts of highly conductive material each of which has an external perimeter of at least 32 inches, a phase conductor disposed within each duct, and extending longitudinally thereof, insulating means including columns of insulating material at longitudinally-spaced locations along each conductor for mounting said conductors within their respective ducts, connecting means for providing short-circuit connections between said ducts at opposite ends of said two ducts, each of said ducts being electrically continuous between said short-circuit connections so as to enable induced currents to circulate around a loop defined by the series combination of said ducts and said connecting means, each of said ducts surrounding its phase conductor at substantially all points along the length of the conductor between said short-circuit connections, said connecting means forming short-circuit connections, between the ends of said two ducts both during the flow of normal current through said phase conductors and during the flow of short-circuit current through said phase conductors, the resistance per unit length of each duct being such that the vectorial difference between the current in its corresponding phase conductor and the induced current in said duct is less than one-third of the phase conductor current,* each of the ducts [is] *being* constructed in such a manner that the induced current flowing in the duct is distributed substantially equally at substantially all generally diametrically-opposed points along the length of the duct extending between said short-circuit connections.

9. [The bus duct apparatus of claim 7] *Isolated-phase bus duct apparatus comprising at least two spaced-apart ducts of highly conductive material each of which has an external perimeter of at least 32 inches, a phase conductor disposed within each duct, and extending longitudinally thereof, insulating means including columns of insulating material at longitudinally-spaced locations along each conductor for mounting said conductors within their respective ducts, connecting means for providing short-circuit connections between said ducts at opposite ends of said two ducts, each of said ducts being electrically continuous between said short-circuit connections so as to enable induced currents to circulate around a loop defined by the series combination of said ducts and said connecting means, each of said ducts surrounding its phase conductor at substantially all points along the length of the conductor between said short-circuit connections, said connecting means forming short-circuit connections between the ends of said two ducts both during the flow of normal current through said phase conductors and during the flow of short-circuit current through said phase conductors, the resistance per unit length of each duct being such that the vectorial difference between the current in its corresponding phase conductor and the induced current in said duct is less than one-third of the phase conductor current,* in combination with a generator for supplying power to said phase conductors at one end thereof and a transformer for receiving power from said phase conductors at the other end thereof, means for solidly connecting said ducts to ground at the generator end of said bus duct apparatus, said transformer including a grounded metallic housing, duct-grounding means connected between said transformer housing and the transformer end of said ducts for providing a return path to the generator via substantially the entire length of one of said ducts for fault current produced by a fault to said transformer housing, and insulating means disposed between said transformer housing and said ducts for preventing induced currents from circulating between said ducts via said transformer housing and said duct-grounding means.

10. The combination of claim 9 in which said generator includes a grounded metallic housing and in which said means for grounding the ducts at the generator end thereof comprises a conductive connection between said generator housing and the generator end of said ducts, and insulating means disposed between said generator housing and said ducts for preventing induced currents from circulating between said ducts via said generator housing and said conductive connection.

11. [The apparatus of claim 7 in which] *Isolated-phase bus duct apparatus comprising at least two spaced-apart ducts of highly conductive material each of which has an external perimeter of at least 32 inches, a phase conductor disposed within each duct, and extending longitudinally thereof, insulating means including columns of insulating material at longitudinally-spaced locations along each conductor for mounting said conductors within their respective ducts, connecting means for providing short-circuit connections between said ducts at opposite ends of said two ducts, each of said ducts being electrically continuous between said short-circuit connections so as to enable induced currents to circulate around a loop defined by the series combination of said ducts and said connecting means, each of said ducts surrounding its phase conductor at substantially all points along the length of the conductor between said short-circuit connections, said connecting means forming short-circuit connections between the ends of said two ducts both during the flow of normal current through said phase conductors and during the flow of short-circuit current through said phase conductors, the resistance per unit length of each duct being such that the vectorial difference between the current in its corresponding phase conductor and the induced current in said duct is less than one-third of the phase conductor current,* said connecting means at each duct-end [comprises] *comprising* metallic structure joined to each of said ducts along joints extending over substantial portions of the duct outer periphery at at least two generally diametrically-opposed locations.

12. [The apparatus of claim 7 in which] *Isolated-phase bus duct apparatus comprising at least two spaced-apart ducts of highly conductive material each of which has an external perimeter of at least 32 inches, a phase conductor disposed within each duct, and extending longitudinally thereof, insulating means including columns of insulating material at longitudinally-spaced locations along each conductor for mounting said conductors within their respective ducts, connecting means for providing short-circuit connections between said ducts at opposite ends of said two ducts, each of said ducts being electrically continuous between said short-circuit connections so as to enable induced currents to circulate around a loop defined by the series combination of said ducts and said connecting means, each of said ducts surrounding its phase conductor at substantially all points along the length of the conductor between said short-circuit connections, said connecting means forming short-circuit connections between the ends of said two ducts both during the flow of normal current through said phase conductors and during the flow of short-circuit current through said phase conductors, the resistance per unit length of each duct being such that the vectorial difference between the current in its corresponding phase conductor and in the induced current in said duct is less than one-third of the phase conductor current,* said connecting means at each duct-end [comprises] *comprising* metallic structure joined to each of said ducts along joints extending over a major portion of the duct outer periphery.

13. The bus duct apparatus of claim 7 in which each of said phase conductors is divided into a pair of branches near one end for connection of said branches to single-phase devices, the branches of each phase conductor respectively leading to a different one of said devices, said ducts each being divided into duct branches surrounding the branches of the corresponding phase conductor, and said connecting means at said one end comprising first short-circuiting conductive means interconnecting the pair of duct branches leading to one of said single-phase devices and second short-circuiting conductive means interconnecting the pair of duct branches leading to another of said single-phase devices.

14. The bus duct apparatus of claim 7 in which each of said ducts comprises a plurality of duct lengths, in which said insulating means for mounting said phase conductors comprises insulators disposed at longitudinally-spaced-apart locations within at least some of the duct lengths of each duct, and in which there is provided means for electrically connecting the duct lengths of each duct in series-circuit relationship to render said ducts electrically continuous between said short-circuit connections.

15. The bus duct apparatus of claim 7 in which said connecting means has a current-carrying capacity sufficient to carry on a continuous basis currents substantially equal in magnitude to the normal currents through said phase conductors and during short circuit conditions currents substantially equal in magnitude to short-circuit currents through said phase conductors.

16. Isolated-phase bus duct apparatus comprising at least two spaced-apart ducts of highly conductive material each of which has an external perimeter of at least 32 inches, a phase conductor disposed within each duct, insulating means including columns of insulating material at longitudinally-spaced locations along each conductor for mounting said conductors in substantially coaxial relationship with respect to their surrounding ducts, connecting means for providing short-circuit connections between said ducts at opposite ends of said two ducts, each of said ducts being electrically continuous between said shoft-circuit connections so as to enable induced current to circulate around a loop defined by the series combination of said ducts and said connecting means, each of said ducts surrounding its conductor at substantially all points along the length of the conductor between said short-circuit connections, said connecting means forming shoft-circuit connections between the ends of said two ducts both during the flow of normal current through said phase conductors and during the flow of short-circuit current through said phase conductors, said apparatus being so constructed that the voltage for driving the induced current through each of the ducts is generated generally uniformly along the length of said duct between said short circuit connections, *each of said ducts comprising a plurality of duct lengths disposed in end-to-end relationship, and means for electrically connecting the duct lengths of each duct in series circuit relationship to render said ducts electrically continuous between said short-circuit connections comprising welded joints extending about substantially the entire periphery of said duct lengths.*

17. The bus duct apparatus of claim 16 [in which each of said ducts comprises a plurality of duct lengths,] in which said insulating means for mounting said phase conductors comprises insulators disposed at longitudinally-spaced-apart locations within at least some of the duct lengths of each duct [and in which there is provided means for electrically connecting the duct lengths of each duct in series-circuit relationship to render said ducts electrically continuous between said short-circuit connections].

18. The bus duct apparatus of claim 16 in which said connecting means has a current-carrying capacity sufficient to carry on a continuous basis currents substantially equal in magnitude to the normal currents through said phase conductors and during short circuit conditions currents substantially equal in magnitude to short-circuit currents through said phase conductors.

19. In the bus duct apparatus of claim 16, conductive supports for said ducts extending between said ducts at spaced-apart locations along the length of the ducts, and means for mounting said ducts on said supports and for electrically connecting said supports to said ducts in such a manner that said supports define at least two longitudinally-spaced-apart electrical connections between said ducts located longitudinally between said short-circuit connections.

20. [The bus duct apparatus of claim 16 in which] *Isolated-phase bus duct apparatus comprising at least two spaced-apart ducts of highly conductive material each of which has an external perimeter of at least 32 inches, a phase conductor disposed within each duct, insulating means including columns of insulating material at longitudinally-spaced locations along each conductor for mounting said conductors in substantially coaxial relationship with respect to their surrounding ducts, connecting means for providing short-circuit connections between said ducts at opposite ends of said two ducts, each of said ducts being electrically continuous between said short-circuit connections so as to enable induced current to circulate around a loop defined by the series combination of said ducts and said connecting means, each of said ducts surrounding its conductor at substantially all points along the length of the conductor between said short-circuit connections, said connecting means forming short-circuit connections between the ends of said two ducts both during the flow of normal current through said phase conductors and during the flow of short-circuit current through said phase conductors, said apparatus being so constructed that the voltage for driving the induced current through each of the ducts is generated generally uniformly along the length of said duct between said short circuit connections,* each of the ducts [is] *being* constructed in such a manner that the induced current flowing in the duct is distributed substantially equally at substantially all generally diametrically-opposed points along the length of the duct extending between said short-circuit connections.

(References on following page)

References Cited

The following references, cited by the Examiner, are of record in the patented file of this patent or the original patent.

UNITED STATES PATENTS

| | | | |
|---|---|---|---|
| 1,454,744 | 5/1923 | Jamieson | 317—103 |
| 1,603,849 | 10/1926 | Hernby | 307—90 |

| | | | |
|---|---|---|---|
| 1,603,875 | 10/1926 | Shanklin | 307—90 |
| 2,796,459 | 6/1957 | Schymik | 174—99 |
| 2,892,012 | 6/1959 | Swerdlow et al. | 174—97 |

ORIS L. RADER, *Primary Examiner.*

T. B. JOIKE, *Assistant Examiner.*